June 14, 1966     H. DREIMANIS     3,255,994
TURBINE WHEEL
Filed Sept. 3, 1963     3 Sheets-Sheet 1
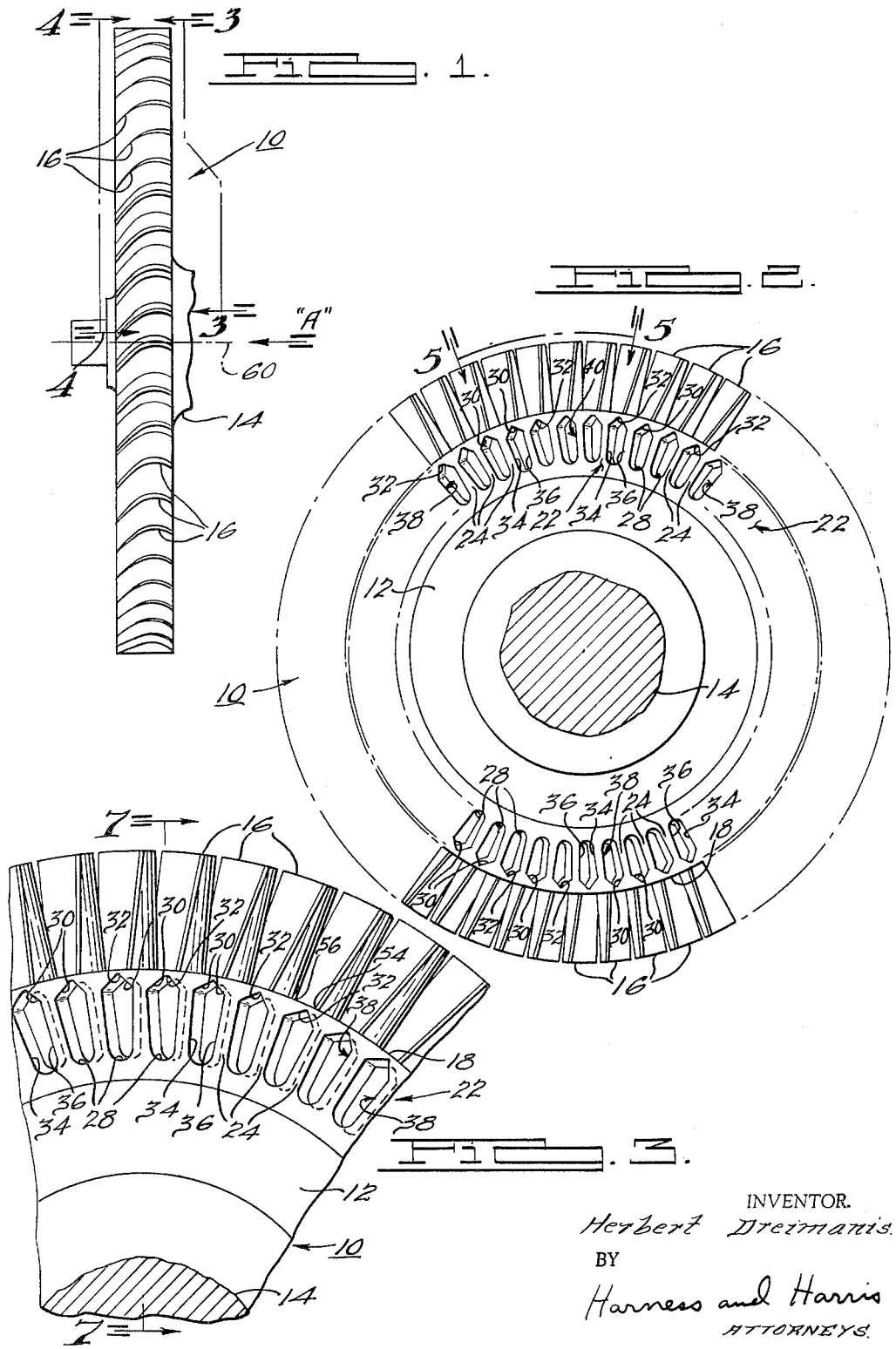
INVENTOR.
Herbert Dreimanis
BY
Harness and Harris
ATTORNEYS

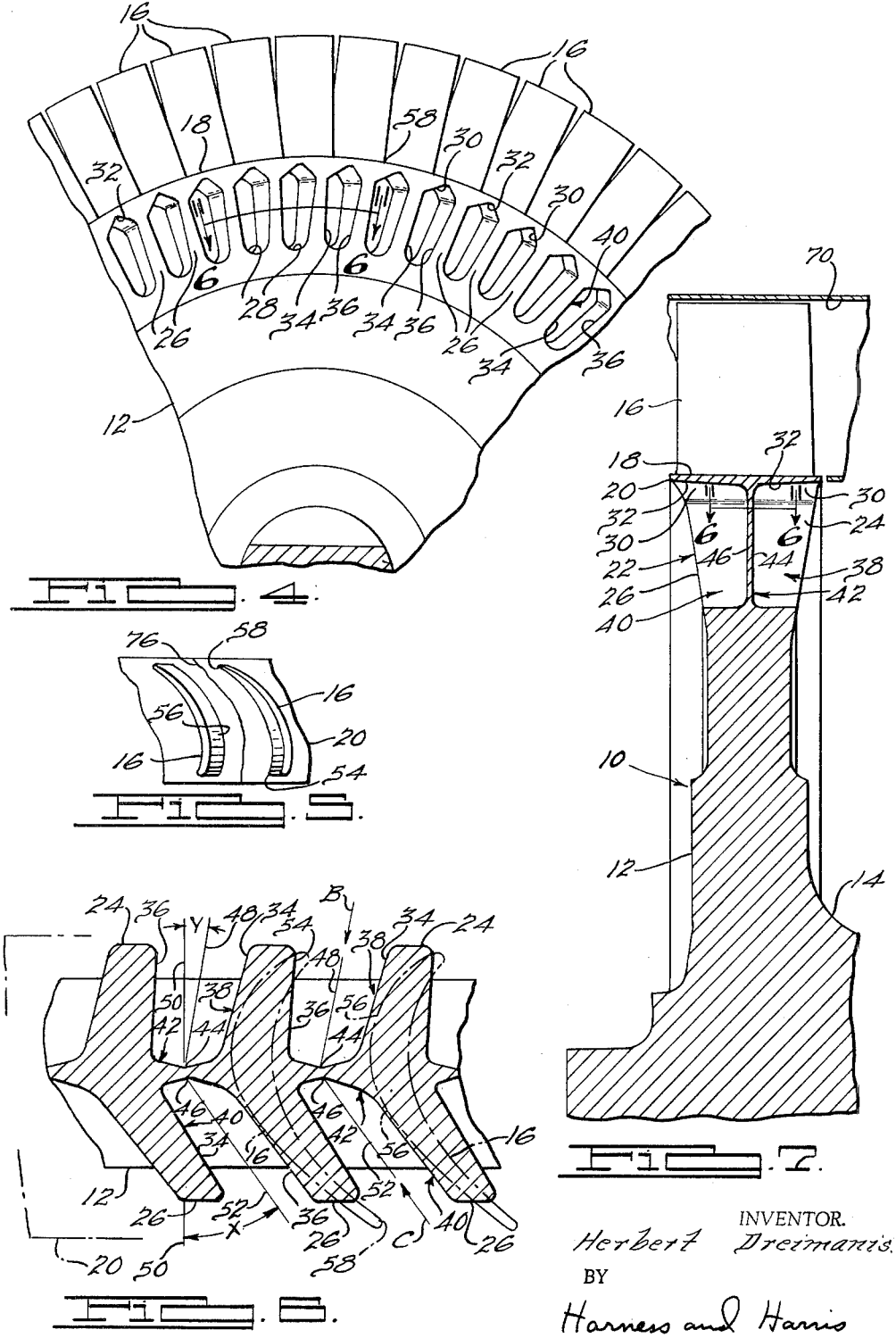

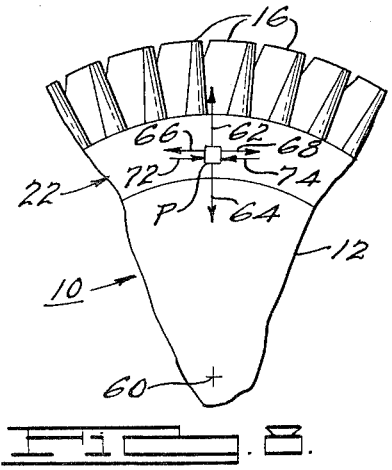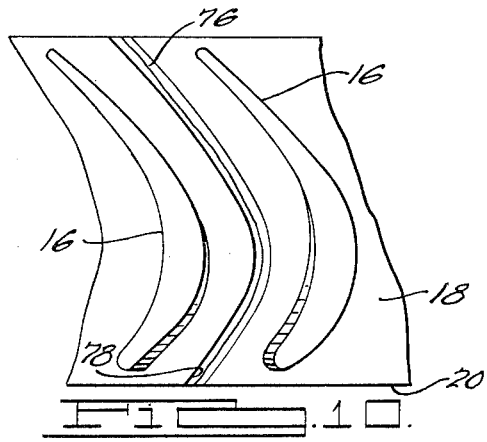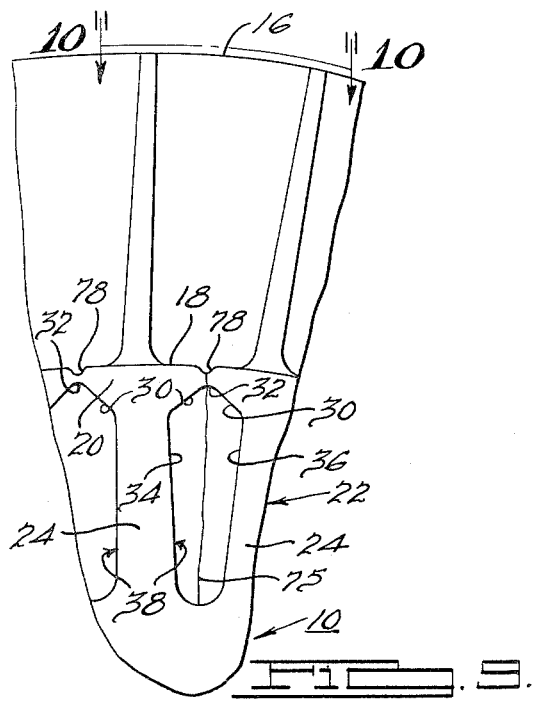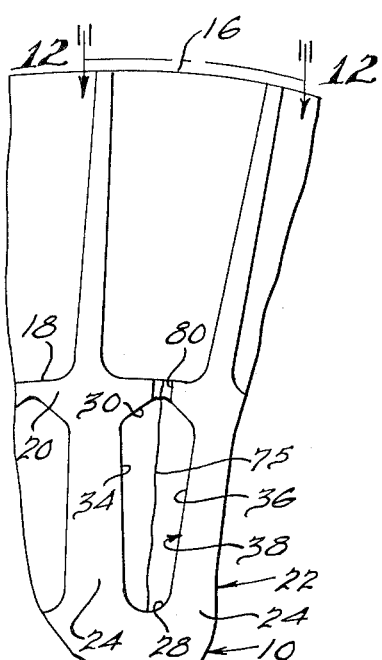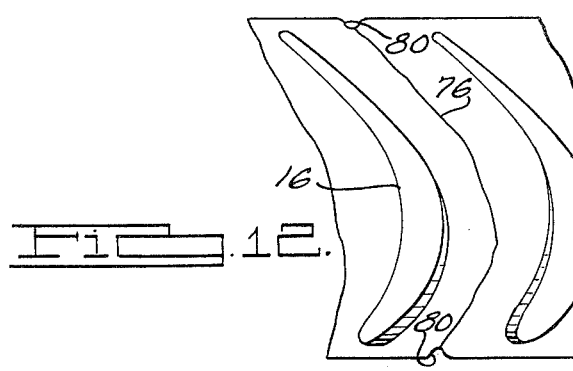

United States Patent Office 3,255,994
Patented June 14, 1966

3,255,994
TURBINE WHEEL
Herbert Dreimanis, Detroit, Mich., assignor to Chrysler Corporation, Highland Park, Mich., a corporation of Delaware
Filed Sept. 3, 1963, Ser. No. 306,139
8 Claims. (Cl. 253—39)

This invention relates generally to gas turbine engines and more particularly to turbine wheels for use therein.

In the past turbine wheels have been formed so as to be comprised generally of a disc-like body portion having a rim formed thereon or secured thereto and a plurality of radially directed circumferentially spaced blades formed on or secured to the rim portion. In some instances the disc body has also been provided with a hub portion for securing the wheel to a cooperating shaft.

In every application of a turbine wheel one of the prime considerations is the inertial characteristics of the wheel. That is, in order to assure quick response by the wheel to the motive fluid passing therethrough, precautions are normally taken to reduce the polar moment of inertia of the wheel. This usually is achieved by reducing the mass of the wheel in somewhat a proportion to the radial distance of that mass away from the axis of rotation of the wheel.

In gas turbine engine applications, the turbine wheels experience various stresses during normal engine operation. These stresses can be broadly classified into two general categories, the first of which includes mechanical stresses due to the centrifugal force resulting from high speed rotation of the turbine wheel. The second category of stresses could be referred to generally as thermo-stresses arising from exposure of at least the turbine blades to relatively high heats as that occasioned by the extremely hot motive gases passing therethrough.

Because of these two categories of stresses the mass of the rims and bodies of turbine wheels of the prior art design could not be effectively reduced to the degree desired in order to obtain a highly responsive turbine wheel. That is, heretofore it has been considered necessary to have the rim and disc body adjacent the rim of a cross-sectional thickness sufficient to prevent cracking of the turbine wheel due to the stresses developed during operation. The cross-sectional thickness in such instances has in turn caused the general peripheral mass of the wheel to increase to the degree resulting in a considerable increase in inertia and consequent loss in wheel response.

An object of this invention is to provide a novel and improved turbine wheel which has a relatively low polar moment of inertia.

Another object of this invention is to provide a turbine wheel of a configuration which effectively reduces thermal stresses normally developed during exposure to relatively hot motive gases.

Other objects and advantages of the invention will become apparent when reference is made to the following description and accompanying drawings wherein:

FIGURE 1 is a side elevational view of a turbine wheel constructed in accordance with the teachings of this invention;

FIGURE 2 is an end view of the turbine wheel taken generally in the direction of arrow A of FIGURE 1;

FIGURE 3 is an enlarged fragmentary elevational view taken substantially on line 3—3 of FIGURE 1;

FIGURE 4 is an enlarged fragmentary elevational view taken substantially on line 4—4 of FIGURE 1 and looking in the direction of the arrows;

FIGURE 5 is a fragmentary elevational view taken generally on line 5—5 of FIGURE 2;

FIGURE 6 is an enlarged fragmentary cross-sectional view taken generally on the plane of line 6—6 of FIGURE 4 and looking in the direction of the arrows;

FIGURE 7 is an enlarged fragmentary cross-sectional view taken generally axially of the turbine wheel as, for example, on the plane of line 7—7 of FIGURE 3;

FIGURE 8 is a fragmentary view, similar to FIGURE 3, diagrammatically illustrating the forces incurred by an infinitesimal particle of the turbine wheel during periods of operation;

FIGURES 9 and 11 are fragmentary views, similar to FIGURE 3, each illustrating a modification of the invention; and FIGURES 10 and 12 are views taken generally on lines 10—10 and 12—12 of FIGURES 9 and 11, respectively.

Certain details are omitted from one or more figures for purposes of clarity.

Referring now in greater detail to the drawings, a turbine wheel 10 is illustrated as being comprised generally of a disc-like body 12 provided with a centrally disposed hub portion 14 for mounting the body 12 to a suitable shaft, and a plurality of radially directed circumferentially spaced blades 16 against which a cooperating motive fluid is directed in order to impart rotative motion to the turbine wheel 10 and its associated shaft. Blades 16 are formed so as to extend generally radially outwardly from the outer surface 18 of rim 20 which comprises a portion of an annular support or pedestal arrangement 22.

The annular support 22 is comprised of a plurality of generally radially directed circumferentially spaced front and rear struts or ribs 24 and 26, respectively. The terms "front" and "rear" are used to denote the position of the ribs axially of the wheel 10. That is, the front ribs 24 would be on the upstream side of the wheel while the rear ribs 26 would be on the downstream side of the wheel.

Succeeding ribs or struts are joined to each other at their respective radially inner-most ends by a fillet-like arcuate portion 28 as shown generally in FIGURES 2, 3 and 4. The radially outer-most ends of each of the ribs is provided with a tapered portion 30 which tapers outwardly from the rib and joins a similarly tapered portion of the adjacent rib to form an apex or juncture 32 which is generally conterminous with the lower portion of the rim 20.

Surfaces 34 and 36 of adjacent front ribs 24 along with tapered portions 30 and arcuate portions 28 collectively define front recesses 38 which extend inwardly and generally axially of the wheel 10. Similarly, surfaces 34 and 36 of adjacent rear ribs 26 along with associated tapered portions 30 and arcuate portions 28 collectively define rear recesses 40 which also extend inwardly and generally axially of the wheel. As illustrated in FIGURES 6 and 7, the front and rear recesses extend inwardly of the wheel 10 towards each other and are separated by a common thin wall 42.

It should be noted that both recesses 38 and 40 extend inwardly into the wheel 10 at a slight angle with respect to a plane containing the axis of the wheel. For example, a plane passing through the middle of recess 38 will have a trace 48 at an angle Y with respect to trace 50 of the plane passing through the axis of wheel 10. Similarly, a plane passing through the middle of recess 40 will have a trace 52 which is at an angle X with respect to trace 50. In the embodiment disclosed, angle X is greater than angle Y; however, as will become apparent the precise relationship of angles X and Y is not controlling in the practice of the invention.

Both sides of each of the walls 42 are preferably tapered inwardly towards each other so as to form indentations 44 and 46 generally along the wall 42 and radially of the wheel 10. Indentations 44 and 46 are provided in order to define an area of reduced cross-sectional thickness in walls 42 thereby creating an area for stress concentration. In certain of particularly successful embodiments of the invention the thickness of the reduced portion of the walls 42 was in the order of 0.010 to 0.020 inch.

Apexes 32, similarly to indentations 44 and 46, also provide areas of reduced cross-sectional thickness, as measured from the respective apexes to the outer surface 18 to rim 20, thereby also creating areas for localized stress concentration.

In FIGURE 6 the root profile of a couple of blades 16 is illustrated in phantom line in order to better illustrate the position of the respective blades to the ribs 24 and 26 immediately radially inwardly of the rim 20.

Referring to FIGURES 3, 4 and 6, if recesses 38 are viewed in the direction of arrow B of FIGURE 6, it can be seen that the outer-most end of the respective apexes 32 are substantially midway of the projected distance between root 54 of the front of one of the blades 16 and root 56 of a median portion of the next adjacent blade 16. Similarly, if recesses 40 are viewed in the direction of arrow C of FIGURE 6, it can be seen that the outer-most end of the respective apexes 32 of recesses 40 are substantially midway of the projected distance between root 58 of the rear of one of the blades 16 and the root 56 of the median portion of the next adjacent blade 16.

In FIGURE 6, the forward and rearward ends of the respective blades are shown as projecting some distance beyond ribs 24 and 26. Such ends are, however, fully supported by the respective ribs because, as illustrated for example in FIGURES 3, 4 and 5, the ribs are provided with not only tapered portions 30 but also taper outwardly from the axially median portion of the wheel so as as to have the largest width axially of the wheel immediately below the rim 20. FIGURE 6 is a cross-sectional view obtained on lines 6—6 of FIGURES 4 and 7 somewhat radially inwardly of where tapered portions 30 join surfaces 34 and 36.

Referring to FIGURES 1 and 8, let it be assumed that the wheel 10 is caused to rotate about its axis 60 and that the square, identified as P, is an infinitesimal particle of the wheel. Due to the centrifugal and centripetal forces developed during rotation of wheel 10, particle P experiences tension as illustrated generally by the force vectors 62 and 64. That is, particle P is urged radially outwardly of wheel 10 but at the same time restrained to some degree by the adjoining particles. The greater the angular velocity, the greater, of course, are forces 62 and 64.

With the high rotational speeds experienced by turbine wheels actual radial expansion of the wheel is incurred. Accordingly, it can be appreciated that such radial expansion requires substantially every infinitesimal particle of the wheel to experience slight radially outward movement. Consequently, the infinitesimal particles circumferentially adjoining particle P cause particle P to be placed in a state generally circumferential or tangential tension as indicated by force vectors 66 and 68.

The forces described above are those resulting from merely rotation of the turbine wheel. However, additional forces are created whenever the wheel 10 is exposed to high heat as for example the hot motive gases employed in a gas turbine engine.

Referring to FIGURES 7 and 8, let it be assumed that hot motive gases are being directed through an annular conduit 70 and against blades 16 so as to impart rotative motion to wheel 10. Due to rotation, particle P will of course experience forces 62, 64, 66 and 68 as previously described. However, because of the heat transfer incurred as between the hot motive gases, the blades 16 and pedestal structure 22, the forces developed on particle P are somewhat altered.

For example, referring to FIGURE 7 it should be apparent that a temperature gradient will exist as between generally blades 16 and the hub 14 of wheel 10 due to the relatively cold hub 14 and the hot motive gases. Consequently, the radially outermost portions such as rim 20 and support structure 22 expand at a greater rate than the adjoining radially inner portions of the wheel 10.

Therefore, since portion 12 of wheel 10 prevents rim 20 and support structure 22 from expanding to the degree normally required by the temperature of the rim and support, rim 20 and wall 42 of support 22 are placed in a state of circumferential or tangential compression. If particle P of FIGURE 8 is considered to be a particle of rim 20, for example, it becomes apparent that because of the attempt to expand by the circumferentially adjoining particles and the restraining effect thereon by the relatively cooler portion of the wheel, that particle P is now placed in a condition of circumferential or tangential compression as indicated generally by force vectors 72 and 74 which have replaced vectors 66 and 68. As the temperature gradient increases the compression experienced in the rim 20 becomes sufficient to result in plastic deformation of the rim material. The deformation accommodates, to some degree, the expansion required by the relatively hot radially outer portions of the wheel.

However, upon subsequent cooling of the wheel 10, as occasioned during, for example, engine shutdown, a reversal of forces occurs. That is, those sections of the radially outer portion of the wheel 10, such as rim 20, attempt to contract and return to their normal state free of induced stresses. However, such contraction is inhibited because these very same portions have previously undergone plastic deformation. Consequently, the particles, such as P, which were previously in a state of tangential compression are once more placed in a state of circumferential or tangential tension as illustrated generally by force vectors 66 and 68. These forces in turn cause cracks to occur generally radially of wheel 10 at points of greatest stress concentration.

The problem of thermally induced stresses as described above is well known to the prior art. It has been a commonly accepted belief, by those skilled in the art, that such thermally induced wheel cracks are incompatible to an otherwise properly functioning turbine wheel and further that a turbine wheel which developed such cracks could not be further safely employed within an engine. Consequently, the prior art has heretofore proposed various arrangements for strengthening the turbine wheel rim and/or thermally isolating the wheel blades 16 from the supporting rim structure. Such proposed solutions have not, however, proven to be entirely satisfactory.

In the embodiment of the invention disclosed, not only does rim 20 experience the various forces described but so also does the wall or web 42 separating recesses 38 and 40. This invention, contrary to the prior art and contrary to the commonly accepted belief by those skilled in the art, provides an arrangement specifically intended to give rise to the occurrence of such thermally induced cracks.

As previously stated, the cross-sectional thickness from apexes 32 to surface 18 of rim 20 are minimal as are the cross-sectional thicknesses of webs 42 between indentations 44 and 46. Accordingly, as compressive forces are created, due to temperature gradients, plastic deformation, if it is to occur, will exhibit itself to the greatest extent in such sections of reduced cross-sectional area. Subsequently, as wheel 10 cools, during periods of for example engine shutdown, reverse tangential tension forces occur on the infinitesimal particles comprising such sections of reduced cross-sectional area. Consequently, cracks are encouraged to occur through such sections of localized stress. As such cracks occur, they will appear through webs or walls 42 in the vicinity of indentations 44 and 46 so as to assume a generally radial position with respect to the axis 60 of the wheel 10. Further, cracks will also occur generally axially of wheel 10 through rim 20 so as to be in a pattern generally defined by plane traces 48 and 52 of FIGURE 6. An example of such a generally axially directed crack is illustrated at 76 of FIGURE 5. The radially inward extension of cracks 75 formed through webs 42 is prevented beyond the general limits defined by the contour of recesses 38 and 40 by the fillet portions 28 (FIGURES 2, 3 and 4) which serve to dissipate the stress concentrations.

By enabling such radial 75 and axial 76 cracks to occur in pre-designated areas, the possibility of having cracks occur in or relatively close to the root or base of the respective turbine blades is averted. Additionally, continued recycling (heating and cooling) of the turbine wheel will not give rise to either uncontrolled extensions of the cracks already formed or in any way allow the occurrence of pernicious cracks.

Both radial and axial cracks even though possibly forming pneumatic leak passages during periods when the turbine wheel is completely cooled, nevertheless effectively prevent any leakage to occur therethrough during normal operation because of the thermal expansion of the metal in which such cracks are formed. That is, as thermal expansion of the metal occurs the opposing surfaces defining the cracks are urged against each other in compression thereby effectively forming a seal.

The invention as disclosed in addition to providing an arrangement whereby cracks can be formed in the turbine wheel in a controlled fashion, provides other important advantages over the prior art. For example, by providing a support pedestal arrangement 22 having recesses 38 and 40, the peripheral mass of the turbine wheel is substantially reduced thereby minimizing the polar inertia of the wheel and consequently increasing its responsiveness to the flow of motive gases directed against blades 16. As previously indicated turbine responsiveness is a critical factor in automotive applications wherein periods of rapidly increased engine demands may follow periods of relatively low demand engine operation.

The invention as disclosed also provides improved energy dissipation during aerodynamic excitation of the turbine blades. That is, once the radial cracks 75 are formed in the webs or walls 42 the blades 16 is then supported by the radially directed ribs 24 and 26. This in effect lengthens the blades 16 in the sense that the blade per se is not attached directly to a rigid rim or disc body portion but rather is secured to the wheel body or disc by means of an intermediate relatively flexible support comprised of said ribs. As a result of this arrangement any vibratory energy induced into the blades, as for example aerodynamically, does not have to be absorbed entirely by the blades alone, but can be dissipated, at least partially, through the blade supporting ribs. Consequently, the blades experience lower fatigue stresses.

The surfaces defining both axial and radial cracks also exhibit another desirable characteristic which is vibration damping. For example, if the blades 16 and supporting ribs are caused to experience any vibration or oscillation generally axially of the turbine wheel 10 the surfaces defining the respective cracks, because of their abutting relationship, frictionally engage each other thereby effectively producing a means of vibration damping.

In addition to the embodiments disclosed by FIGURES 1 through 8, further embodiments and modifications of the invention are possible. For example, FIGURE 9 illustrates one modification of the invention wherein a groove 78 is provided in the outer surface 18 of rim 20 so as to enhance the tendency of the rim to crack in the manner previously disclosed. The pattern of groove 78, while formed in surface 18, nevertheless follows the general direction of the apexes 32 of the respective cracks 38 and 40 so as to define a pattern generally illustrated by crack 76 of FIGURES 5 and 10.

FIGURES 11 and 12 illustrate a still further modification of the invention which consists essentially of forming indentations 80 on the front and rear edges of rim 20 generally intermediate of adjoining blades so as to also enhance the formation of cracks through the rim 20. The modifications of FIGURES 9 and 11 may of course be used in combination.

Although only a preferred embodiment and two modifications of the invention have been disclosed and described, it is apparent that other embodiments and modifications of the invention are possible within the scope of the appended claims.

I claim:

1. A turbine wheel comprising a disc-like body section, a circumferentially continuous annular pedestal portion formed integrally with and carried by said body section peripherally thereof, and a plurality of circumferentially spaced radially directed turbine blades formed integrally with and carried by said pedestal portion peripherally thereof, said pedestal portion comprising a plurality of circumferentially spaced radially directed supporting struts formed integrally with and positioned about said disc body section in a manner causing each of said supporting struts to be radially inwardly of and in general radial alignment with at least one of said plurality of turbine blades, a plurality of radially directed wall portions, each of said wall portions being respectively formed integrally with and joining successive ones of said spaced supporting struts, at least selected ones of said wall portions having formed therein a radially directed structurally weakened area so as to define a generally radially directed area for localizing thermally induced stress concentration thereby enhancing the opportunity for radially directed cracks to be formed through said areas of stress concentration whenever said turbine wheel is first caused to experience a radial temperature gradient and subsequently permitted to experience a reduction in said temperature gradient, and a relatively thin annular axially extending rim formed integrally with and interconnecting each of said struts so as to be intermediate of said struts and turbine blades, the radially outermost portion of said struts having an outer periphery of a pattern approximating the cross-sectional configuration of that portion of the turbine blade immediately adjacent the rim.

2. In a turbine wheel having a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed ribs extending generally axially of said wheel, an annular axially extending rim, said ribs being formed so as to be integrally joined with said disc body at their respective radially innermost ends and to be integrally joined to said annular axially extending rim at their respective radially outermost ends, and a radially directed wall formed between and joining successive spaced ribs, each of said walls having formed therein a generally radially directed structurally weakened area so as to define a generally radially directed area for localizing thermally induced stress concentration thereby enhancing the opportunity for radially directed controlled thermal stress dissipating cracks to be formed through said areas of stress concentration whenever said turbine wheel is first caused to experience a radial temperature gradient and subsequently permitted to experience a reduction in said temperature gradient.

3. In a turbine wheel having a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed ribs extending generally axially of said wheel, an annular axially extending rim, said ribs being formed so as to be integrally joined with said disc body at their respective radially innermost ends and to be integrally joined to said annular axially extending rim at their respective radially outermost ends, radially directed walls formed integrally with and joining successive spaced ribs and rim, at least selected ones of said walls being provided with a portion for localizing thermally induced stresses to an area which is generally radially directed so as to cause radiating areas of stress concentration in such selected walls, and means selectively formed in said rim for localizing thermally induced stresses to areas which are generally axially directed so as to cause axial areas of stress concentration in said rim, said axial areas of stress concentration being spaced from and intermediate successive spaced blades, said radial and axial areas of stress concentration combining to provide means for enhancing the occurrence of controlled thermal stress dissipating cracks through each of said areas whenever said turbine wheel is first caused to experience a radial temperature gradient and subsequently permitted to experience a reduction in said temperature gradient.

4. In a turbine wheel having a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed ribs extending generally axially of said wheel, an annular axially extending rim, said ribs being formed so as to be integrally joined with said disc body at their respective radially innermost ends and to be integrally joined to said annular axially extending rim at their respective radially outermost ends, radially directed walls formed integrally with and joining successive spaced ribs and rim, at least selected ones of said walls being provided with a portion for localizing thermally induced stresses to an area which is generally radially directed so as to cause radiating areas of stress concentration in such selected walls, means selectively formed in said rim for localizing thermally induced stresses to areas which are generally axially directed so as to cause axial areas of stress concentration in said rim, said axial areas of stress concentration being spaced from and intermediate successive spaced blades, said radial and axial areas of stress concentration combining to provide means for enhancing the occurrence of controlled thermal stress dissipating cracks through each of said areas whenever said turbine wheel is first caused to experience a radial temperature gradient and subsequently permitted to experience a reduction in said temperature gradient, and additional stress dissipating means formed between the radially innermost ends of said ribs for inhibiting the incursion into said disc body of said thermal stress dissipating cracks formed through said radial areas of stress concentration.

5. A turbine wheel comprising a disc-like body, a plurality of circumferentially spaced radially directed supporting struts formed integrally with and carried by said body generally radially thereof, a plurality of circumferentially spaced radially directed turbine blades supported by said supporting struts, said blades and struts being arranged so as to be in substantial radial alignment way each other first means joining adjoining struts integrally to each other thereby causing said struts to become fixed and rigid, and second means for changing at least some of said rigid struts to relatively bendable supporting struts thereby enabling the dissipation of vibratory forces otherwise normally totally absorbed by the blade alone over a longer length which includes the blade and the relatively bendable supporting strut radially inwardly thereof, said second means comprising radially directed structurally weakened areas formed in said first joining means intermediate said adjoining struts so as to define generally radially directed areas for localizing thermally induced stress concentration and thereby producing thermally induced radially directed cracks through said areas of localized stress concentration, said cracks functioning to separate said otherwise rigid struts, and said cracks occurring after said turbine wheel has first experienced a radial temperature gradient and subsequently permitted to experience a reduction in said temperature gradient.

6. In a turbine wheel having a disc-like body and a plurality of circumferentially spaced radially directed turbine blades, means for damping blade vibration arising from aerodynamic excitation thereof during use of said wheel, said means comprising an annular blade support portion formed integrally with and carried by said body peripherally thereof, said support portion comprising a plurality of circumferentially spaced radially directed blade supporting struts, a plurality of webs, each of said webs respectively integrally interconnecting successive spaced supporting struts, said blades and struts being arranged so that each blade is provided with one supporting strut radially inwardly thereof with said blades being integrally connected thereto, and a radially directed crack formed to each side of a supporting strut and through adjoining ones of said interconnecting webs enabling said supporting strut to experience a degree of flexibility in order to absorb some of the vibratory forces incurred by the blade supported thereby, the surfaces defining said crack in said webs being effective upon rubbing each other, as during periods wherein said turbine wheel is experiencing a substantial degree of radial temperature gradient, to dampen movement of said flexible supporting strut and blade.

7. A turbine wheel comprising a disc-like body; a circumferentially continuous annular pedestal portion radiating therefrom; a plurality of circumferentially spaced turbine wheel blades supported on said pedestal portion and radiating outwardly therefrom; said pedestal portion comprising a plurality of circumferentially spaced radially extending generally axially directed ribs integrally joined at their respective radially innermost ends to said body; an arcuate connecting portion integrally joining the radially innermost ends of pairs of adjacent ribs so as to provide a surface for stress dissipation between such adjacent ribs; an annular axially directed rim joining the radially outermost ends of said ribs; a tapered connecting portion formed integrally with and on each side of each of said ribs near the radially outermost end thereof integrally joining the radially innermost surface of said rim; a web generally transverse of said wheel integrally joining adjacent ribs medially thereof; a plurality of generally axially directed radially extending front and rear recesses defined generally by said ribs, arcuate connecting portions, tapered connecting portions and webs; each of said front recesses being so formed as to have a generally radial plane, which passes through the middle thereof, forming a slight angle with respect to a second plane containing the axis of said wheel; each of said rear recesses being so formed as to have a generally radial plane, which passes through the middle thereof, forming a large angle with respect to said second plane containing the axis of said wheel; said large angle being substantially greater than said slight angle formed by said front recesses; and means provided along each of said webs and between said blades for creating areas of localized stress concentrations therealong.

8. In a turbine wheel having a disc-like body and a plurality of circumferentially spaced radially directed turbine blades, a circumferentially continuous annular pedestal portion formed integrally with and carried by said body and in turn peripherally carrying said turbine blades, said annular pedestal portion comprising a plurality of radially directed blade supporting struts, said struts integrally supporting said blades at their respective radially outermost ends and being integrally joined at their respective radially innermost ends to said disc body, and a plurality of webs, each of said webs respectively integrally interconnecting successive spaced supporting struts, at least selected ones of said plurality of webs being provided with a radially directed area for the concentration therein of thermally induced stresses, and a radially directed controlled stress dissipating crack formed through said radially directed area, said stress dissipating crack further being characterized by having the opposed surfaces defining said crack more nearly approach a completely abutting relationship with respect to each other as the turbine wheel is exposed to and experiences increasing radial temperature gradients, said surfaces being effective upon attaining a substantially complete abutting relationship with respect to each other to substantially preclude the passage of motive turbine gases therebetween.

References Cited by the Examiner

UNITED STATES PATENTS

| | | | |
|---|---|---|---|
| 2,380,276 | 7/1945 | Warren | 253—77 |
| 2,460,893 | 2/1949 | MacClutcheon | 253—77 |
| 2,472,886 | 6/1949 | Conrad et al. | 253—77 |
| 2,620,554 | 12/1952 | Mochel | 29—156.8 |
| 2,660,400 | 11/1953 | Griffith | 253—77.4 |
| 2,772,854 | 12/1956 | Anxionnaz | 253—77 |
| 2,888,239 | 5/1959 | Slemmons | 253—39 |
| 2,922,619 | 1/1960 | Slemmons | 253—77 |
| 3,002,266 | 10/1961 | Lynn | 29—156.8 |
| 3,104,093 | 9/1963 | Craig | 253—77 |

FOREIGN PATENTS

| | | |
|---|---|---|
| 624,166 | 7/1961 | Canada. |
| 1,256,467 | 2/1961 | France. |
| 652,099 | 4/1951 | Great Britain. |
| 708,836 | 5/1954 | Great Britain. |

SAMUEL LEVINE, *Primary Examiner.*

JULIUS E. WEST, *Examiner.*

E. A. POWELL, *Assistant Examiner.*